(12) United States Patent
Eriksson et al.

(10) Patent No.: US 6,200,197 B1
(45) Date of Patent: *Mar. 13, 2001

(54) METHOD FOR MACHINING AND FORMING A TRANSCURRENT OPENING IN A FIBER-REINFORCED COMPOSITE MATERIAL

(75) Inventors: Ingvar Eriksson, Stockholm; Jan Bäcklund, Lidingö; Leif Zackrisson, Stockholm, all of (SE)

(73) Assignee: AB Strukturteknologier i Stockholm, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/354,459

(22) Filed: Dec. 12, 1994

Related U.S. Application Data

(63) Continuation of application No. 08/064,812, filed on May 19, 1993.

(30) Foreign Application Priority Data

May 21, 1992 (SE) .................................................. 9201420

(51) Int. Cl.$^7$ ........................................................ B24B 9/06
(52) U.S. Cl. ................................................. 451/44; 451/28
(58) Field of Search .................................. 451/41, 43, 44, 451/28, 61, 211, 441; 156/98, 94; 52/514; 428/63; 29/402.06, 402.11, 402.12, 402.15; 264/36, 162, 154, 155

(56) References Cited

U.S. PATENT DOCUMENTS

| | | | |
|---|---|---|---|
| 4,231,692 | * | 11/1980 | Brabetz et al. ........................ 408/230 |
| 4,519,732 | * | 5/1985 | Sutcliffe ................................ 264/155 |
| 4,680,897 | * | 7/1987 | Daniels ................................ 51/281 R |
| 4,713,286 | * | 12/1987 | Bunting et al. ....................... 428/323 |
| 4,720,218 | * | 1/1988 | DeFries et al. ....................... 451/541 |
| 4,800,686 | * | 1/1989 | Hirabayashi et al. ................ 451/541 |
| 4,978,404 | * | 12/1990 | Westerman, Jr. ..................... 156/98 |
| 5,034,254 | * | 7/1991 | Cologna et al. ....................... 264/36 |
| 5,190,611 | * | 3/1993 | Cologna et al. ....................... 156/98 |
| 5,274,963 | * | 1/1994 | Tsur ................................... 51/283 E |

FOREIGN PATENT DOCUMENTS

| | | | |
|---|---|---|---|
| 2298413 | * | 8/1976 | (FR) .................................. 51/283 E |
| 0106762 | * | 8/1980 | (JP) .................................. 51/283 E |
| 0650823 | * | 3/1979 | (SU) .................................... 264/154 |

OTHER PUBLICATIONS

Article From Machining Source Book, Reprinted From Journal of Applied Metalworking, Jan. 1984, pp. 128–142, Grinding of Metals; Theory and Application, By S. Malkin (missing pp 138 & 139).

* cited by examiner

Primary Examiner—Robert A. Rose
(74) Attorney, Agent, or Firm—Taylor & Aust, P.C.

(57) ABSTRACT

The invention relates to a method for machining and forming transcurrent openings in fibre-reinforced composite materials. Openings with damage-free edges can be formed with high precision by positioning a rotating grinding tool in a preformed hole. In conjunction with this the material is arranged in such a way that the axis of rotation of the grinding tool is essentially perpendicular to the longitudinal direction of the fibres at the edge of the hole. The opening is machined and formed by causing the grinding tool on the one hand to rotate about its own axis and on the other hand to describe an orbital motion relative to the edge of the hole. Any damage/defects caused in the course of preforming are removed in this way.

4 Claims, 2 Drawing Sheets

METHOD FOR MACHINING AND FORMING A TRANSCURRENT OPENING IN A FIBER-REINFORCED COMPOSITE MATERIAL

This is a continuation of application Ser. No. 08/064,812, filed May 19, 1993.

BACKGROUND OF THE INVENTION

The present invention relates to a method for machining and forming a transcurrent opening in a fibre-reinforced composite material starting from a preformed hole, in conjunction with which at least one rotatable grinding tool with a wear-resistant outer working surface and with a diameter considerably smaller than that of the preformed hole is positioned in the hole, and the hole is machined and formed by causing the grinding tool on the one hand to rotate about its own axis and on the other hand to describe a translation motion relative to the edge of the hole.

Polymer composite materials have been known since the 1950s. These materials are composed of a protective and consolidating polymer, either thermoplastic or thermosetting resin plastic, usually referred to as the matrix, and fibres (e.g. glass, carbon or aramide fibres), which may be regarded as reinforcing material. The fibres may be continuous and oriented in certain directions, or may be relatively short and arranged at random in the matrix. Composites with continuous and oriented fibres give products with superior mechanical characteristics to conventional polymer and metallic materials, in particular with regard to their weight-related strength and rigidity. Composites with shorter fibres find applications where their characteristics are subject to rather lower requirements. One inhibiting factor for the increased use of composite materials is the absence of effective methods of cutting machining. The physical and chemical properties of composite materials mean that familiar machining methods cannot be applied generally with successful results.

Composite materials for practical applications often contain holes for various purposes. The holes may be required, for example, to accommodate wiring or to permit assembly or inspection. One particularly important category of hole is bolt holes. Structures for practical applications are often built up from components which have been joined together to produce a finished product. The purpose of the joint is to transmit the load from one part of the structure to another. A common method of joining is the bolted joint in which the load is transmitted via either shearing forces or tensile forces in the bolt. The strength of a bolted joint is influenced to a considerable degree by the quality and accuracy of the holes. Reference can be made here to three particular problem areas which can arise in conjunction with making holes in polymer composite materials:

Low Interlaminar Strength.

When machining laminated composite materials, the risk is present of the layers separating (delaminating) due to the low interlaminar strength. Extensive delamination damage can reduce the strength of the material.

Low Heat-and-cold Resistance of Certain Thermoplastics.

The heat release during machining can cause the matrix to soften and to block the tool, making further machining impossible. In order to achieve good hole quality, therefore, effective cooling of the tool/hole edge is required, and the cut material (shavings, chips and grinding dust) must be removed continuously from the hole.

High Resistance to Wear of Fibres.

When composite fibres are machined by a process involving cutting, severe tool wear occurs as a consequence of the high wear-resistant characteristics of the fibre materials. This leads to high wear costs, especially when making holes with high precision requirements.

The methods used, to make holes in composite laminates traditionally involve drilling, milling, sawing and grinding. The problem associated with these hole forming methods as they are applied at the present time is that they are not sufficiently effective from a technicali/financial point of view.

One general problem associated with cutting machining with traditional metal-based tools is the high wear costs. Drilling calls for considerable care to be taken in order to avoid delamination damage on both the entry side and the exit side. In order to achieve the required hole quality, cutters made of special materials are needed, and special procedures must be worked out. In order to avoid extensive delamination damage to the exit side of the laminate, it is necessary for local lateral pressure to be applied around the edge of the hole. Another previously disclosed method of protecting the exit side from damage is to provide the laminate with an extra protective layer.

Sawing is a manifestly unsuitable method for producing holes with high accuracy requirements. Making holes by grinding involves the use of a hollow tubular body in the form of a cylinder, the cutting end of which is coated with a wear-resistant surface layer. Holes are produced by grinding the surface of the material transversally by causing the grinding tool to rotate. This method is slow and provides low precision.

SUMMARY OF THE INVENTION

The purpose of the proposed invention is to eliminate the shortcomings and limitations associated with previously disclosed methods and to permit the efficient (cost-effective) making of holes with high precision without causing damage with an adverse effect on strength, thereby ensuring repeatable and high quality. This is achieved through the invention by positioning the fibre-reinforced material in such a way that the axis of rotation of the grinding tool lies essentially perpendicular to the longitudinal direction of the fibres at the edge of the hole, that the size/geometry of the finished hole differs significantly compared with the preformed hole, and that the cutting tool is in the form of a grinding tool, in conjunction with which the radial extent of any damage/defects caused when making the preformed hole define a lower limit for the quantity of material to be removed by cutting machining.

It should be pointed out in this context that methods for machining holes in which a tool caused to rotate about an axis of rotation is also caused to describe an orbital motion (i.e. the axis of rotation is displaced so that the tool is able to move relative to the edge of the hole) are previously disclosed. Previously disclosed in SE 173 899 is a machine tool with a tool holder rotating eccentrically about a main shaft, in which the distance between the tool holder and the main shaft is adjustable. A guide component, which rotates about the main shaft together with the tool holder, is used to adjust the distance between the tool holder and the main shaft. The guide component rotating together with the tool holder is arranged at right angles to the main shaft and is executed as a curved sheet capable of rotating about the main shaft in relation to the tool holder, with the guiding curved surface of which the tool holder is in direct engagement. The advantages of the present invention are, amongst other things, the absence of free play and the space-saving design of the guide component. SE 382 506 discloses a combined cutting tool which is caused to rotate for the purpose of making holes in stationary workpieces, which holes can be provided with a conical entrance chamfer.

What is not previously disclosed, however, is that such a method can be used to form damage-free holes in fibre-reinforced materials by arranging the axis of rotation of the grinding tool perpendicular to the longitudinal direction of the fibres at the edge of the hole. The proposed method also differs from previously disclosed surface-modifying hole-machining methods in that the amount of material removed by cutting machining is considerably larger. When forming holes by the radial removal of material, the amount of material removed by cutting machining is proportional to the change in radius before and after machining. In the case of traditional surface-modifying machining, the profile depth of the edge of the hole is a characteristic indicator of the change in radius. When machining by the proposed method, the radial extent of any damage defines a lower limit for the difference in the radius before and after machining. This lower limit is generally considerably greater than the profile depth of the edge of the hole. It will be appreciated from the above that the size of the finished formed opening differs significantly compared with the preformed hole.

The method exhibits a number of essential advantages compared with previously disclosed methods.

The method permits transcurrent openings to be made without causing damage with an adverse effect on strength (damage in the preformed hole is removed by cutting machining).

The method permits transcurrent openings to be made to within close tolerances. The dimensional accuracy of the opening is determined essentially by the accuracy of positioning of the grinding tool in the opening. No particularly strict requirements are imposed, however, on the geometry of the grinding tool, since an individual is easily able to calibrate before use.

The method reduces the risk of blocking the grinding tool. Because the grinding tool is considerably smaller than the opening, the method permits material which has been removed by cutting machining to be removed simply, for example with compressed air. The method also permits effective cooling of the grinding tool and the edge of the hole.

The method largely reduces wear costs compared with previously disclosed methods, thanks to the ability to impart a wear-resistant outer working surface to the grinding tool.

The method requires a preformed hole. This hole, which may be considerably smaller than the final formed transcurrent opening, can be made by a previously disclosed method. Low requirements are imposed on the quality of the preformed hole, however, for which reasons traditional tools can be used for a much longer period without having to be scrapped/reground than would be the case if they were to be used traditionally.

DETAILED DESCRIPTION OF A PREFERRED EMBODIMENT

Figure 3:
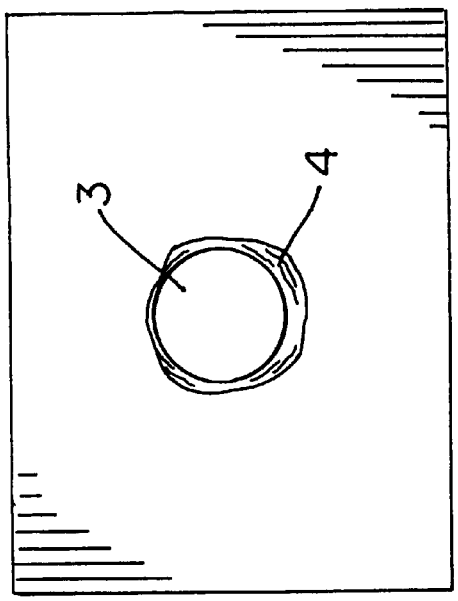
FIGS. 3 and 4 show a preformed hole in the sheet.
Figure 4:
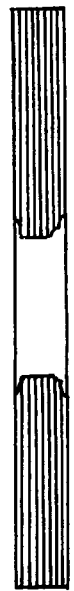
Figure 1:
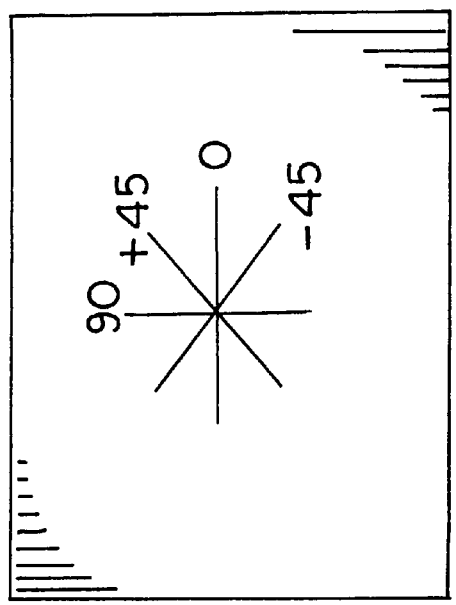
FIGS. 1 and 2 show the direction of the fibres in a laminated, fibre-reinforced composite sheet.
Figure 2:
Figure 5:
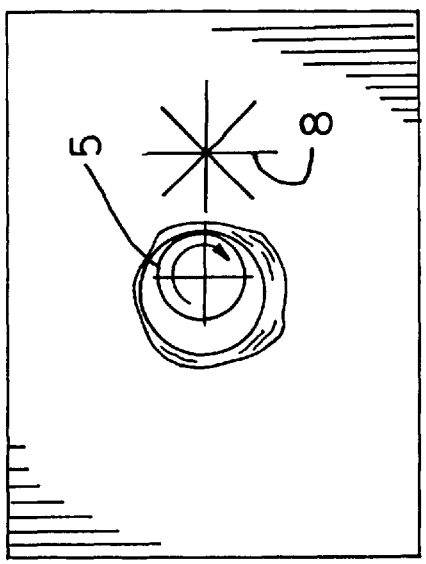
FIGS. 5–8 illustrate how a transcurrent opening is formed in the sheet with the help of a rotating grinding tool.
Figure 6:
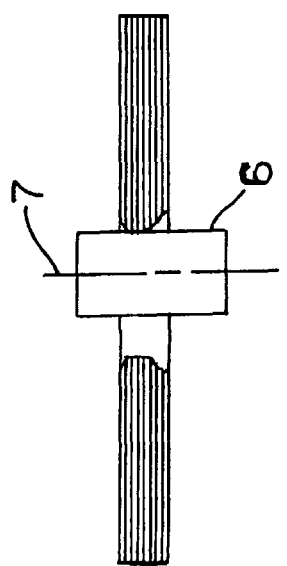
Figure 7:
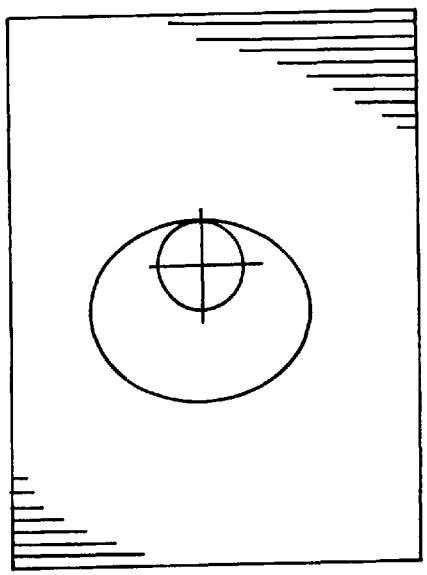
Figure 8:
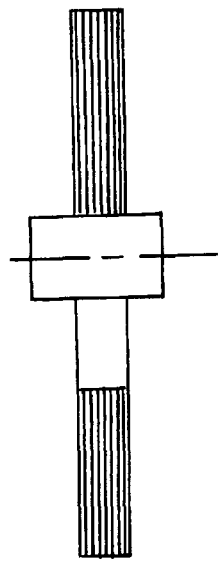

As seen in FIGS. 1 and 2, a flat sheet 1 (a laminate) is built up from a number of laminae 2 (layers) with continuous fibres, which laminae are arranged one on top of the other. The fibres are arranged in planes parallel with the plane of the laminate. The directions of the fibres (0, 90, +45 and −45 degrees) are represented schematically in FIG. 1. An opening in the laminate is formed by making a preformed circular hole 3 (FIGS. 3 and 4) by a traditional method. This causes damage/defects 4 at the edge of the hole 3. A rotating grinding tool 5 (FIGS. 5–8) with a wear-resistant outer working surface 6 is positioned in the preformed hole 3. In conjunction with this, the laminate is positioned in such a way that the axis of rotation 7 of the grinding tool 5 is perpendicular to the longitudinal directions 8 of the fibres, i.e. so that cutting machining takes place in planes parallel to the plane of the laminate. The opening is machined by causing the grinding tool on the one hand to rotate about its own axis and on the other hand to describe a translation motion relative to the edge of the opening. The damage/defects 4 are removed in the course of machining. The size of the finished formed opening differs significantly in comparison with the preformed hole 3. Note that the diameter of the grinding tool 5 is distinctly smaller in size than either the preformed hole 3 or the finished formed opening, as can be seen from FIGS. 2b and 2c.

While this invention has been described as having a preferred design, the present invention can be further modified within the spirit and scope of this disclosure. This application is therefore intended to cover any variations, uses, or adaptations of the invention using its general principles.

What is claimed is:

1. A method of machining a transverse opening in a fiber-reinforced composite material, said method comprising the steps of:

forming a hole in a composite material, said composite material being of laminated construction with each lamina having a plurality of fibers oriented in a respective longitudinal direction, said forming step resulting in delamination and splintering of said formed hole about a radial periphery thereof;

positioning a rotatable cutting tool in the formed hole, said cutting tool having a wear-resistant outer working surface and a diameter which is smaller than a diameter of the formed hole, said cutting tool defining an axis of rotation;

positioning the composite material whereby said axis of rotation is disposed substantially perpendicular to each said respective longitudinal direction; and machining the transverse opening in the composite material by rotating the cutting tool about the axis of rotation and moving the cutting tool relative to an edge of the formed hole, said moving of the cutting tool dependent on a radial extent of any physical defects in the composite material caused from making the formed hole, whereby substantially all of said physical defects caused from making the formed hole are removed from the composite material, the transverse opening having at least one of a size and geometry which is substantially different from a corresponding at least one of a size and geometry of the formed hole;

wherein said machining step further comprises moving said cutting tool in a direction which is substantially parallel to each said lamina at said formed hole.

2. The method of claim 1, wherein said cutting tool comprises a grinding tool.

3. The method of claim 1, wherein said machining step comprises moving the cutting tool in a rotational motion.

4. The method of claim 1, wherein said forming step is carried out using said cutting tool.

* * * * *